United States Patent
Bradley et al.

(10) Patent No.: US 8,445,813 B2
(45) Date of Patent: May 21, 2013

(54) METHOD OF BREACHING A BARRIER

(75) Inventors: Timothy Bradley, Loogootee, IN (US); Eric Hillenbrand, Evansville, IN (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 914 days.

(21) Appl. No.: 12/543,276

(22) Filed: Aug. 18, 2009

(65) Prior Publication Data

US 2011/0024405 A1 Feb. 3, 2011

Related U.S. Application Data

(63) Continuation of application No. 12/511,056, filed on Jul. 28, 2009.

(51) Int. Cl.
*B23K 26/00* (2006.01)

(52) U.S. Cl.
USPC .................................................. 219/121.72

(58) Field of Classification Search ............... 219/121.6, 219/121.67–121.72, 121.85
See application file for complete search history.

(56) References Cited

U.S. PATENT DOCUMENTS

| | | | |
|---|---|---|---|
| 3,392,259 A * | 7/1968 | Meier ......................... | 219/121.6 |
| 3,622,743 A | 11/1971 | Muncheryan | |
| 4,177,580 A | 12/1979 | Marshall et al. | |
| 4,580,557 A | 4/1986 | Hertzmann | |
| 5,272,716 A | 12/1993 | Soltz et al. | |
| 5,401,171 A | 3/1995 | Paghidiwala | |
| 5,501,680 A * | 3/1996 | Kurtz et al. ........................ | 606/9 |
| 5,694,408 A * | 12/1997 | Bott et al. ......................... | 372/6 |
| 5,780,807 A | 7/1998 | Saunders | |
| 6,187,213 B1 * | 2/2001 | Smith et al. ...................... | 216/28 |
| 6,269,617 B1 * | 8/2001 | Blanchard ........................... | 56/1 |
| 6,593,540 B1 | 7/2003 | Baker et al. | |
| 6,670,222 B1 | 12/2003 | Brodsky | |
| 6,700,094 B1 | 3/2004 | Kuntze | |
| 6,703,582 B2 | 3/2004 | Smart et al. | |
| 7,397,014 B2 | 7/2008 | Hart et al. | |
| 8,202,268 B1 * | 6/2012 | Wells et al. ...................... | 606/10 |
| 2004/0128932 A1 * | 7/2004 | Estape ......................... | 52/506.01 |
| 2007/0034615 A1 * | 2/2007 | Kleine .................... | 219/121.72 |
| 2008/0144673 A1 | 6/2008 | Gapontsev | |
| 2009/0092157 A1 | 4/2009 | Gapontsev | |
| 2010/0076475 A1 | 3/2010 | Yates et al. | |
| 2010/0176097 A1 * | 7/2010 | Zhu .......................... | 219/121.63 |

FOREIGN PATENT DOCUMENTS

| | | |
|---|---|---|
| WO | WO 99/07439 | 2/1999 |
| WO | WO 2006/031351 | 3/2006 |

OTHER PUBLICATIONS

Galvanauskas et al., "KW-Power Fiber Lasers with Single Transverse Mode Output," Sep. 22, 2005, 5 pgs., downloaded from http://www.nufern.com/whitepaper_detail.php/30.

(Continued)

*Primary Examiner* — Samuel M Heinrich
(74) *Attorney, Agent, or Firm* — Christopher A. Monsey

(57) ABSTRACT

A portable cutting device and related method of use are disclosed. The method may include the steps of providing a laser source and a battery power supply, and housing the laser source and the battery power supply in at least one storage container carried by a user. The method may further include the step of cutting a barrier with optical energy produced by the laser source and delivered by a handheld laser directing device.

20 Claims, 11 Drawing Sheets

OTHER PUBLICATIONS

Peavey et al., "Comparison of Cortical Bone Ablations by Using Infrared Laser Wavelengths 2.9 to 9.2 µm," Lasers in Surgery and Medicine, 1999, vol. 26, pp. 421-434.

Valentine, "COTS laser technology targets emerging battlefield threats," RF Design, Nov. 29, 2007, 2 pgs., downloaded on Jun. 27, 2009 from www.printthis.clickabiliyt.com/pt/cpt?action=cpt&title=COTTS+Laser+Technology+.

Waarts et al., "Fiber Lasers at JDS Uniphase," Fiber Lasers: Technology, Systems, and Applications, Proc. of Society of Photo-Opitcal Instrumentation Engineers, 2004, vol. 5335, 12 pgs.

* cited by examiner

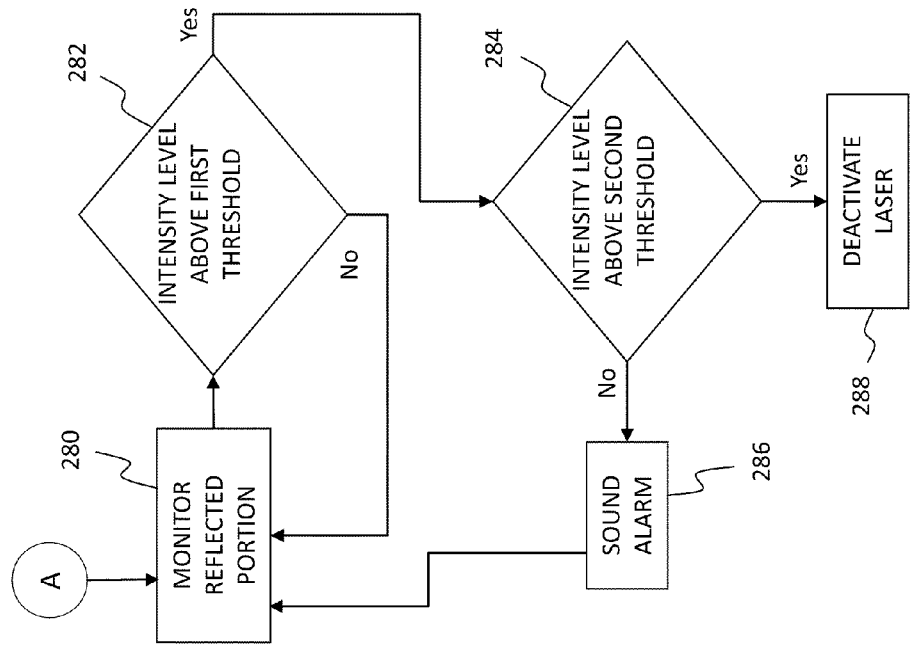
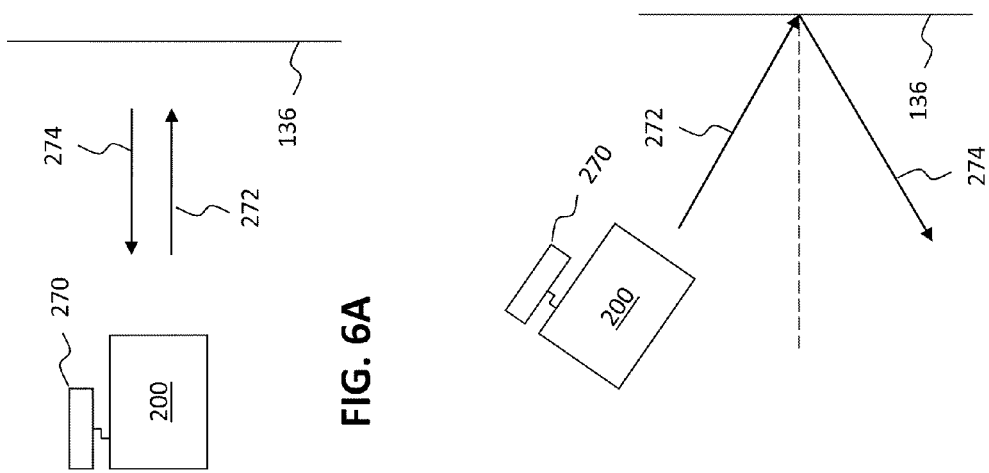

METHOD OF BREACHING A BARRIER

CROSS-REFERENCE TO RELATED APPLICATIONS

The present application claims priority to and is a continuation of U.S. patent application Ser. No. 12/511,056 titled "PORTABLE CUTTING DEVICE FOR BREACHING A BARRIER," filed Jul. 28, 2009, the disclosure of which is expressly incorporated by reference herein.

STATEMENT REGARDING FEDERALLY SPONSORED RESEARCH OR DEVELOPMENT

The invention described herein was made in the performance of official duties by employees of the Department of the Navy and may be manufactured, used and licensed by or for the United States Government for any governmental purpose without payment of any royalties thereon.

BACKGROUND OF THE INVENTION

The present invention relates generally to devices for cutting through a barrier and, more particularly, to portable devices which are capable of breaching a barrier.

Often times law enforcement, military personnel, fire personnel, and other types of rescue personnel need to open or otherwise cross a barrier. Exemplary barriers include doors, walls, and other impediments to advancement. Often times this requires the barrier to be altered to permit passage.

Often these personnel are working in confined areas and do not have access to large units which can assist in the breaching of a barrier. A need exists for a portable unit which can be carried by a person and which is capable providing enough power to effectively breach a barrier.

SUMMARY OF THE INVENTION

In an exemplary embodiment of the present disclosure, a portable cutting device is disclosed. In another exemplary embodiment of the present disclosure, a method of using a portable cutting device is disclosed.

In a further exemplary embodiment of the present disclosure, a method of cutting a barrier is provided. The method includes the steps of providing a laser source and a battery power supply, housing the laser source and the battery power supply in at least one storage container which is supported by a human operator, and providing a handheld laser directing device which directs optical energy produced by the laser source at the barrier. The method further includes the steps of coupling the laser source with the handheld laser directing device with an optical conduit, and cutting the barrier with optical energy produced by the laser source and delivered by the handheld laser directing device.

BRIEF DESCRIPTION OF THE DRAWINGS

The foregoing aspects and many of the attendant advantages of this invention will become more readily appreciated as the same become better understood by reference to the following detailed description when taken in conjunction with the accompanying drawings.

FIG. 6A illustrates a first positioning of the laser directing device relative to the barrier;

FIG. 6B illustrates a second positioning of the laser directing device relative to the barrier;

FIG. 7 illustrates a processing sequence of a controller of the portable cutting device;

Figure 1:
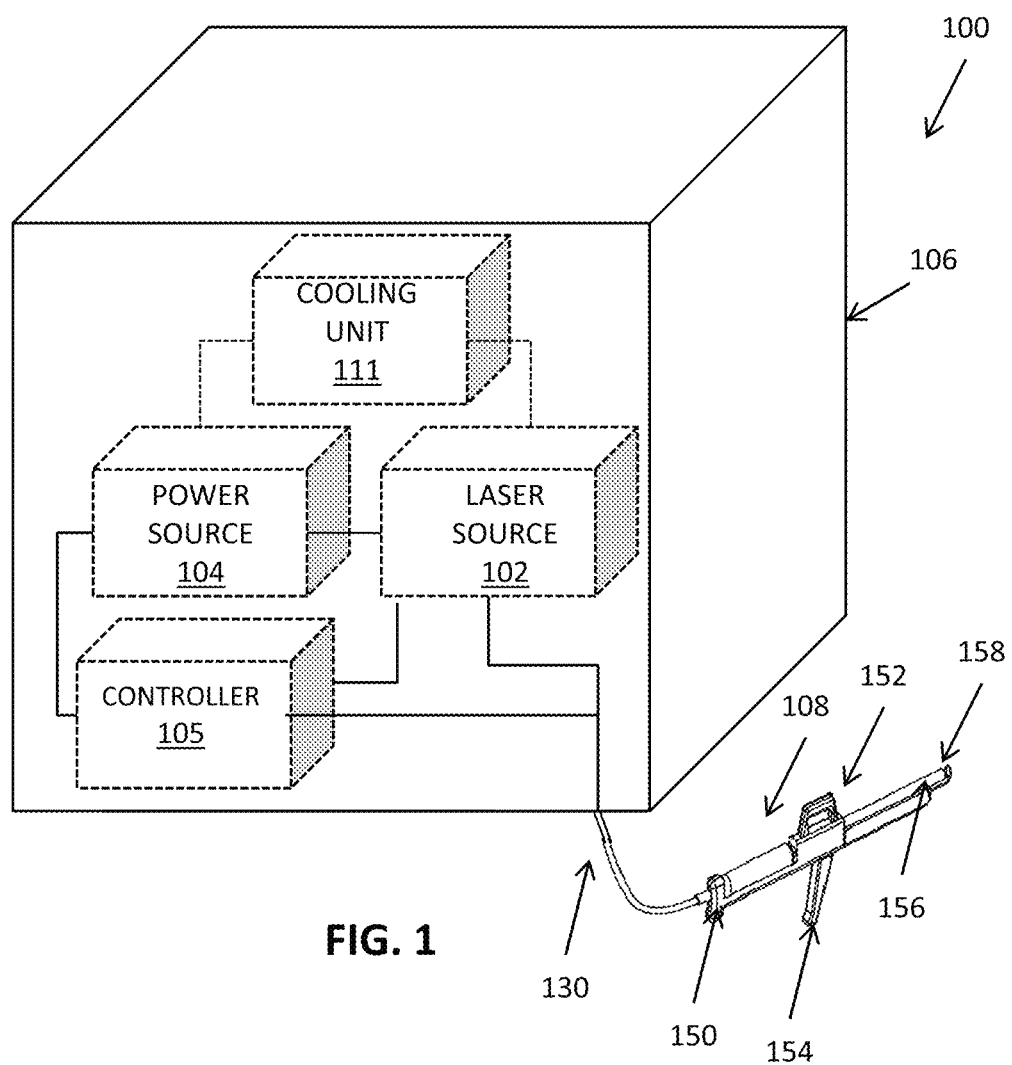
FIG. 1 is a representative view of a portable cutting device.

Corresponding reference characters indicate corresponding parts throughout the several views. Although the drawings represent embodiments of various features and components according to the present disclosure, the drawings are not necessarily to scale and certain features may be exaggerated in order to better illustrate and explain the present disclosure. The exemplification set out herein illustrates embodiments of the invention, and such exemplifications are not to be construed as limiting the scope of the invention in any manner.

DETAILED DESCRIPTION OF THE DRAWINGS

For the purposes of promoting an understanding of the principles of the invention, reference will now be made to the embodiments illustrated in the drawings, which are described below. The embodiments disclosed below are not intended to be exhaustive or limit the invention to the precise form disclosed in the following detailed description. Rather, the embodiments are chosen and described so that others skilled in the art may utilize their teachings. It will be understood that no limitation of the scope of the invention is thereby intended. The invention includes any alterations and further modifications in the illustrated devices and described methods and further applications of the principles of the invention which would normally occur to one skilled in the art to which the invention relates.

Referring to FIG. 1, a portable cutting device 100 is shown. The portable cutting device 100 includes a laser source 102, a power supply 104, a storage container 106, and a laser directing device 108. A cooling unit 111 may optionally be provided to actively cool one or both of laser source 102 and power supply 104. In one embodiment, cooling unit 111 is an air-cooled chiller. In one embodiment, cooling unit 111 is a thermo-electric cooling system. In one embodiment, cooling unit 111 is an on-demand cooler which directs cooling air at the optical coupler which couples laser source 102 to optical conduit 130. The on-demand cooler may be manually activated or activated based on a monitored temperature sensor value. The cooling air of the on-demand cooler is a non-flammable gas.

Figure 2:
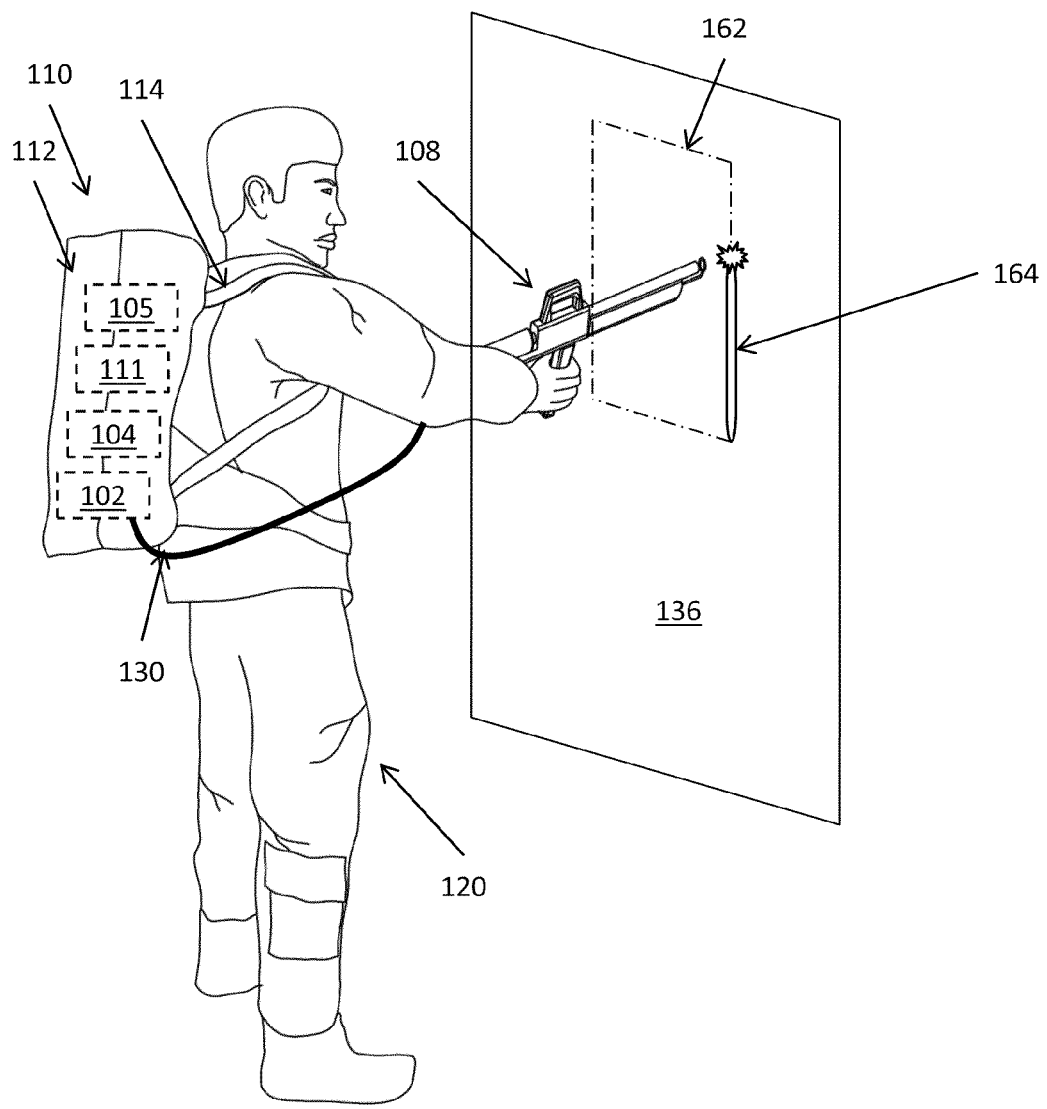
FIG. 2 shows the portable cutting device of FIG. 1 being used to breach a barrier.

In one embodiment, storage container 106 is a backpack, such as backpack 110 shown in FIG. 2. Backpack 110 is worn by a human operator 120. Backpack 110 includes a cargo carrying portion 112 and two straps 114 which are positioned over the shoulders of the human operator 120 and extend under the arms of the human operator 120. Backpack 110 is positioned on the back side of the human operator 120. In one embodiment, storage container 106 is positioned on a front side of the human operator 120. In one embodiment, storage container 106 is positioned to either a left side or a right side of the human operator 120. In one embodiment, storage container 106 is positioned on at least two of a back side, a left side, a front side, and a right side of the human operator 120.

Figure 2A:
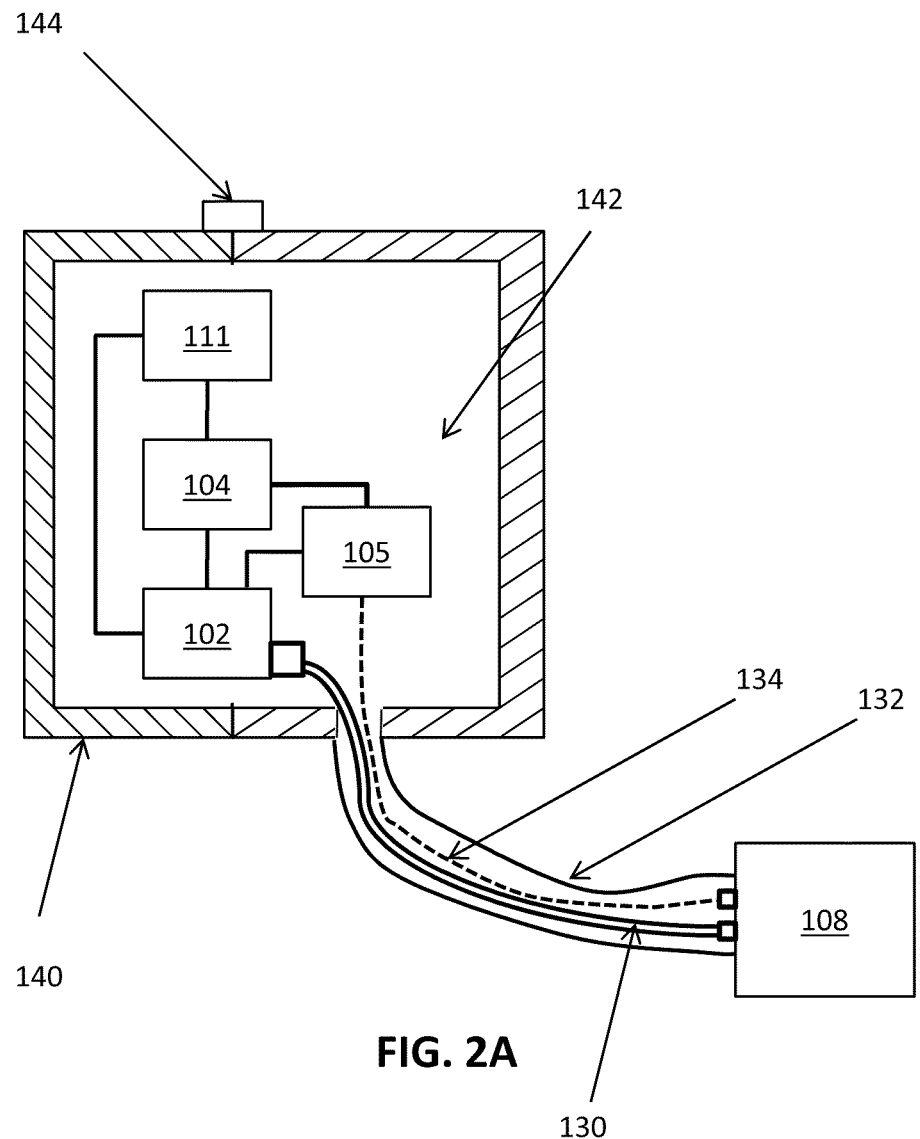
FIG. 2A is a representative view of the cargo carrying portion of the backpack shown in FIG. 2.

In one embodiment, laser source 102, power supply 104, and controller 105 are positioned within cargo carrying portion 112 of backpack 110 for transport by human operator 120. Referring to FIG. 2A, cargo carrying portion 112 is represented. Cargo carrying portion 112 includes a first portion 140 and a second portion 142 which cooperate to form an interior space of cargo carrying portion 112. In one embodiment, cargo carrying portion 112 is made of a flexible material and first portion 140 and second portion 142 are secured together with one or more suitable fasteners 144. Exemplary fasteners include zippers, snaps, and other suitable fasteners. In one embodiment, first portion 140 and second portion 142 are integrally formed and are seperatable only along a portion, such as the left side, top side, and right side. In one embodiment, cargo carrying portion 112 is a hard case and first portion 140 and second portion 142 are secured together with one or more suitable fasteners 144. Exemplary fasteners include latches and other suitable fasteners. Regardless of the configuration, first portion 140 and second portion 142 cooperate to provide a closed space for carrying laser source 102, power supply 104, controller 105, and, optionally, cooling unit 111 during transport and the ability to open at least a portion of cargo carrying portion 112 to access laser source 102, power supply 104, controller 10, or cooling unit 111, such as to replace the batteries of power supply 104.

Laser directing device 108 is held by the human operator 120. Laser directing device 108 includes a stock portion 150 which may be positioned next to the shoulder of human operator 120. Laser directing device 108 also includes a handle 152 whereby the hand of the operator may carry laser directing device 108 and a grip 154 which human operator 120 may grasp during operation of portable cutting device 100.

Laser directing device 108 is coupled to laser source 102 through an optical conduit 130. Exemplary optical conduits include fiber optic cable. Laser directing device 108 also includes an optical conduit 156 which is coupled to optical conduit 130. Optical energy generated by laser source 102 travels through optical conduit 130 and optical conduit 156 and is discharged through an end 158 of laser directing device 108 towards a barrier 136 (see FIG. 2). The energy discharged by laser directing device 108 is of sufficient strength to cut the material of barrier 136. Laser directing device 108 includes an optical system 210 which shapes the energy exiting optical conduit 156 of laser directing device 108 to focus it at a focus 214. Focusing optics 160 concentrate the energy onto a defined location on the barrier 136.

Returning to FIG. 2A, optical conduit 130 is coupled to laser source 102 at a location in the interior of cargo carrying portion 112. Optical conduit 130 extends through a wall of cargo carrying portion 112 and is coupled to laser directing device 108 outside of storage container 106 at optical connector 206 (see FIG. 5). In one embodiment, optical conduit 130 couples to laser directing device 108 through grip 154.

Optical conduit 130 is provided in a protective sheath 132. The protective sheath 132 should have a high thermal conductivity and limit a bend radius of optical conduit 130. In one embodiment, protective sheath 132 is made of segmented pieces of metal coupled together. Also included with protective sheath 132 is an electrical control and signal cable 134 which couples controller 105 with components of laser directing device 108. In one embodiment, controller 105 is coupled to a controller 230 of laser directing device 108. In one embodiment, controller 105 is coupled to controller 230 over through a standard RS-232 or RS-422 interface. In one embodiment, signal cable 134 is an optical fiber and controller 105 communicates with controller 230 via any type of standard protocol, such as Internet protocol. As explained herein, controller 230 interfaces with the operator 120, the components of laser directing device 108, and monitors sensors associated with laser directing device 108. Controller 230 then communicates this information to controller 105 which controls the operation of laser source 102.

Laser source 102, in one embodiment, is a continuous wave laser. In one embodiment, laser source 102 is a fiber laser. In one embodiment, laser source 102 is a continuous wave Ytterbium single mode fiber laser. Exemplary continuous wave single mode fiber lasers are provided by IPG Laser GmBH located at 50 Old Webster Road in Oxford, Mass. 01540. Details regarding an exemplary laser source 102 are provided in U.S. patent application Ser. No. 11/973,437, titled POWERFUL FIBER LASER SYSTEM, assigned to IPG Photonics Corporation, the disclosure of which is expressly incorporated by reference herein. Details regarding an exemplary laser source 102 are provided in U.S. patent application Ser. No. 11/611,247, titled FIBER LASER WITH LARGE MODE AREA FIBER, assigned to IPG Photonics Corporation, the disclosure of which is expressly incorporated by reference herein. In one embodiment, laser source 102 is a solid state laser.

Figure 11:
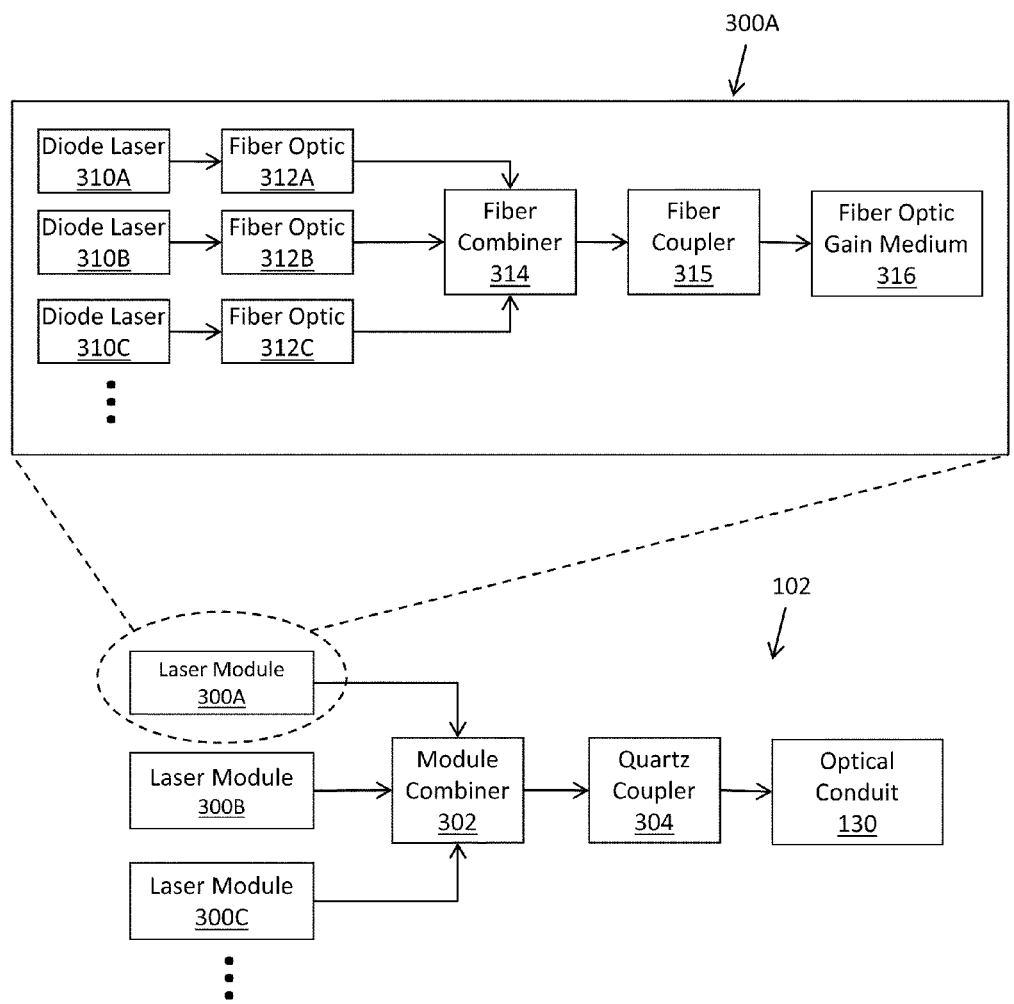
FIG. 11 illustrates an exemplary laser source.

Referring to FIG. 11, an exemplary configuration of laser source 102 is shown. Laser source 102 includes a plurality of individual modules 300 each of which provide a single mode 1.07 micrometer output beam. The output of each of modules 300 is combined together through a module combiner 302 which brings the energy together in a single beam. This combined beam is coupled to optical conduit 130 through a quartz coupler 304. Although three laser modules 300 are illustrated any number of laser modules 300 may be included.

The components of a given laser module 300 are also shown in FIG. 11. The laser module 300 includes a plurality of diode lasers 310 each of which are coupled into a respective Ytterbium fiber 312. The output of the Ytterbium fibers 312 are combined through a fiber combiner 314 which brings the energy together. This energy is fed through a coupler 315 into an Ytterbium fiber optic gain medium 316 which produces there from a single mode 1.07 micrometer output beam. Although three diode laser sets 310 are illustrated any number of diode laser sets 310 may be included.

In one embodiment, the power of laser source 102 is about 3 kilowatts. In one embodiment, the power level of laser source 102 is about 5 kilowatts. In one embodiment, the power level of laser source 102 is about 10 kilowatts. In one embodiment, the power level of laser source 102 is about 20 kilowatts. In one embodiment, the power level of laser source 102 is about 50 kilowatts. In one embodiment, the power level of laser source 102 is between about 3 kilowatts and 20 kilowatts. In one embodiment, the power level of laser source 102 is at least 3 kilowatts.

In one embodiment, power supply 104 is a portable power supply. An exemplary portable power supply is one or more batteries, such as rechargeable batteries. Exemplary rechargeable batteries include lithium-ion batteries and lithium polymer batteries. Exemplary lithium-ion batteries include commercially available cells, such as those available from A123 Systems located in Watertown, Mass. In one embodiment, the cells have a nominal amp-hour rating of 2.3 Ah and a nominal load voltage of 3.3 DCV/cell. Further exemplary lithium-ion batteries include commercially available cells available from SAFT America, Inc. located at 313 Crescent St Ne in Valdese, N.C. in Watertown, Mass. In one embodiment, the cells have a nominal maximum current of 500A, a specific power of 5.1 kW/kg, a specific energy of 430 kJ/kg, and a mass of 0.94 kg.

Figure 3:
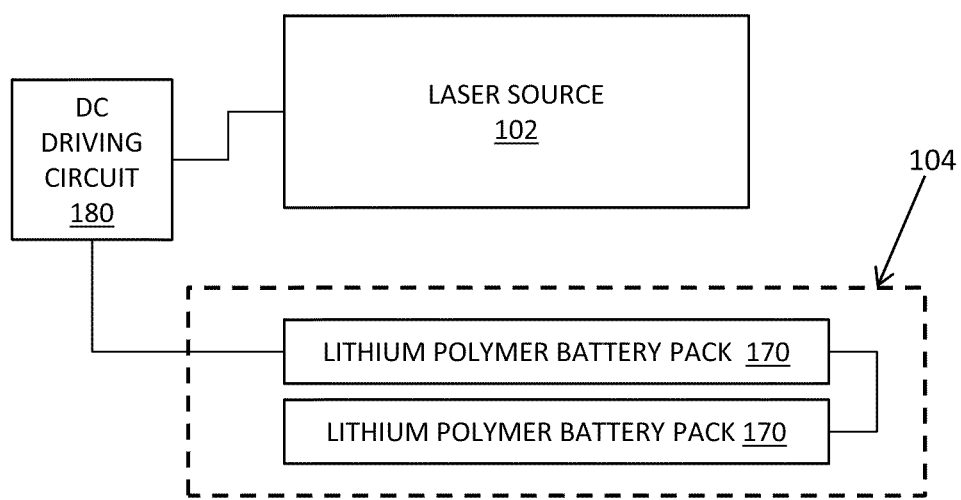
FIG. 3 is a representative view of an exemplary portable battery power supply.

Referring to FIG. 3, multiple lithium-ion battery packs 170 are coupled together in series to produce power supply 104. Each of lithium-ion battery pack 170 delivers about 5 kilowatts of power for about six minutes. Since two units are shown coupled together in FIG. 3, the resultant power supply 104 can deliver about 10 kilowatts of power. Each of lithium-ion battery pack 170 includes multiple individual lithium-ion batteries. In one embodiment, lithium-ion battery pack 170 commercially available cells available from A123 Systems located in Watertown, Mass. The two lithium-ion battery packs 170 together weigh about 28 pounds (13.6 kg).

Figure 4:
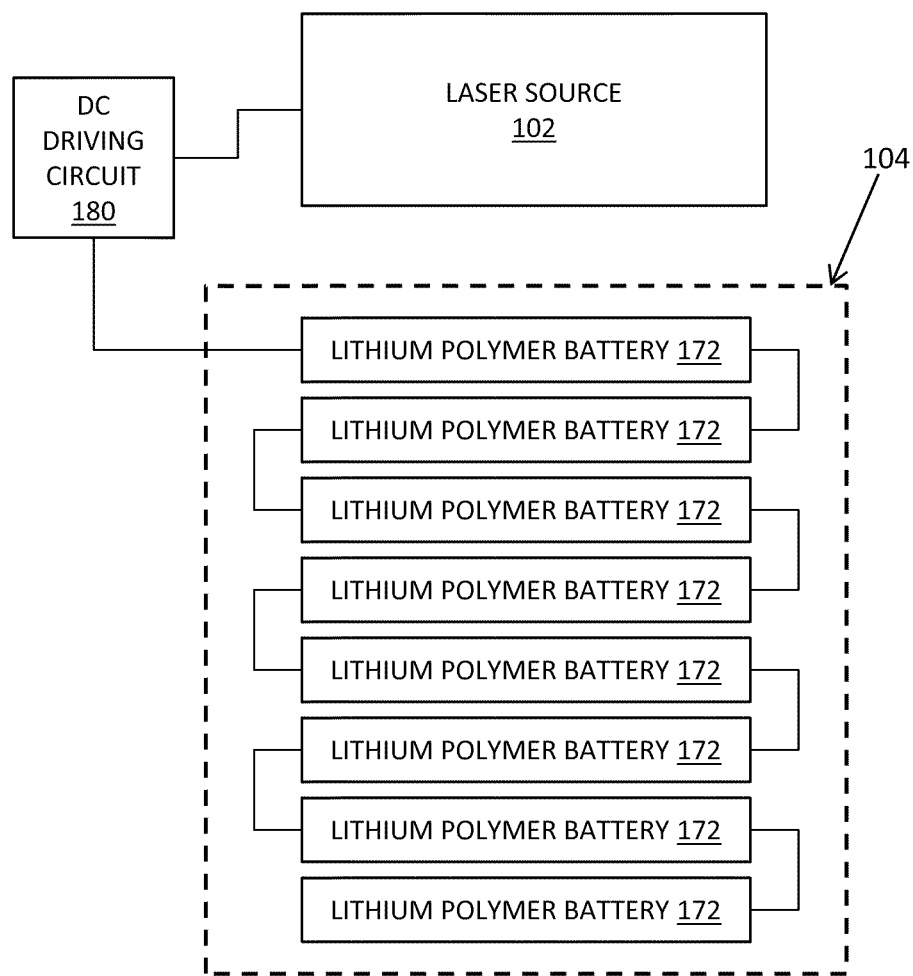
FIG. 4 is a representative view of an exemplary second portable battery power supply.

Referring to FIG. 4, multiple lithium polymer batteries 172 are coupled together in series to produce power supply 104. Each of lithium polymer batteries 172 delivers about 4.5 kilowatts of power for about two minutes. Since eight units are shown coupled together in FIG. 4, the resultant power supply 104 can deliver about 13 kilowatts of power for about six minutes. The eight lithium polymer batteries 172 together weigh about 21 pounds (9.6 kg).

In one embodiment, laser source 102 is a three kilowatt Yterrbium single mode fiber laser such as ones commercially available from IPG Photonics located at IPG Photonics Corporation, 50 Old Webster Road Oxford, Mass. 01540 USA and power supply 104 is as shown in FIG. 4. This combination results in portable cutting device 100 having a cutting speed of about fifty inches per minute for 0.5 inch thick steel. This combination may cut up to 300 inches of material on a single charge of power supply 104, arranged as shown in FIG. 4. In general, commercial laser sources include an AC-to-DC converter to convert power from an AC source to DC power for laser source 102. Since power supply 104 already provides DC power, when a commercial laser source is being used the AC-to-DC converter is removed and replaced with DC driving circuit 180. DC driving circuit 180 provides power from power supply 104 to laser source 102 and regulates the power level provided. In a similar fashion, commercial laser sources often include cooling lines to cool the laser source and over-temperature sensors to monitor the temperature of the laser source. In one embodiment, when a commercial laser source is being used the cooling lines are removed and the over-temperature sensors of the commercial laser source are over-ridden. With this arrangement and using the laser directing device 108 represented in FIG. 5, laser directing device 108 was operated at 3 kW power for 120 seconds without disabling the laser source 102.

Figure 9:
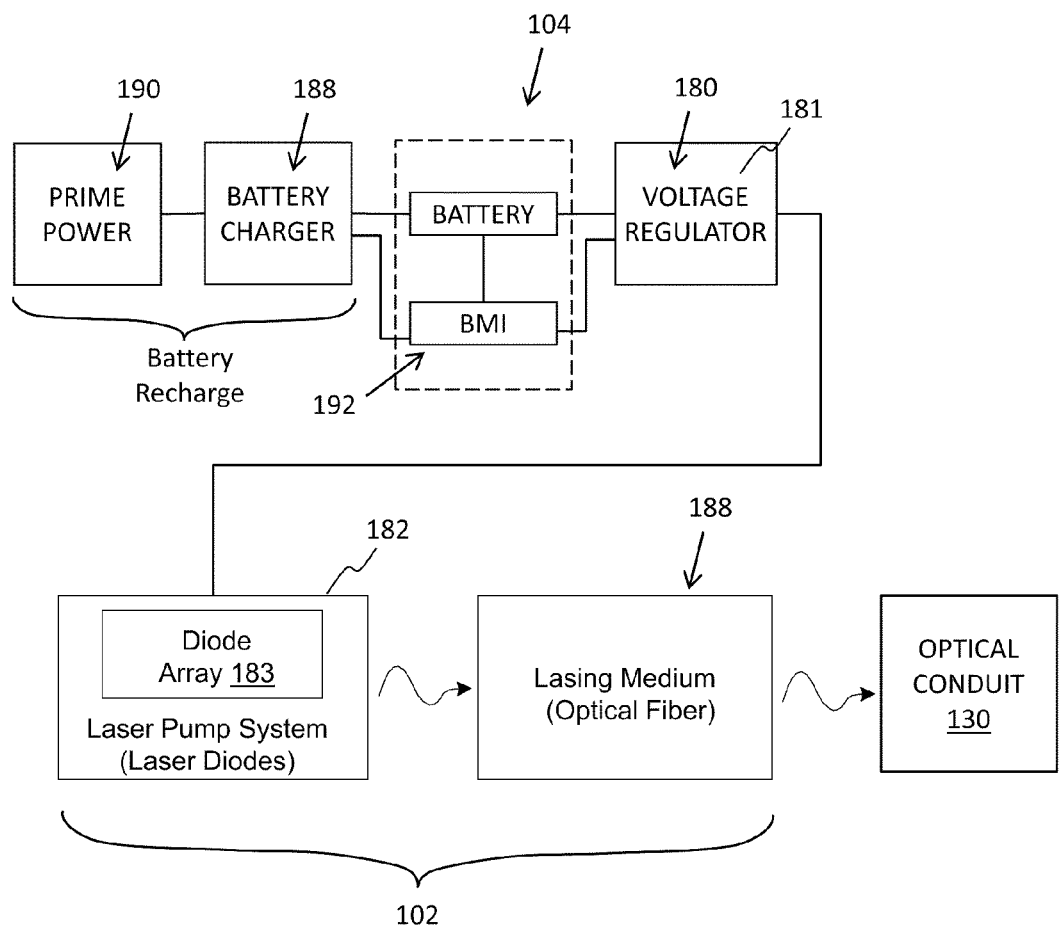
FIG. 9 illustrates a first arrangement of components of the portable cutting device.
Figure 10:
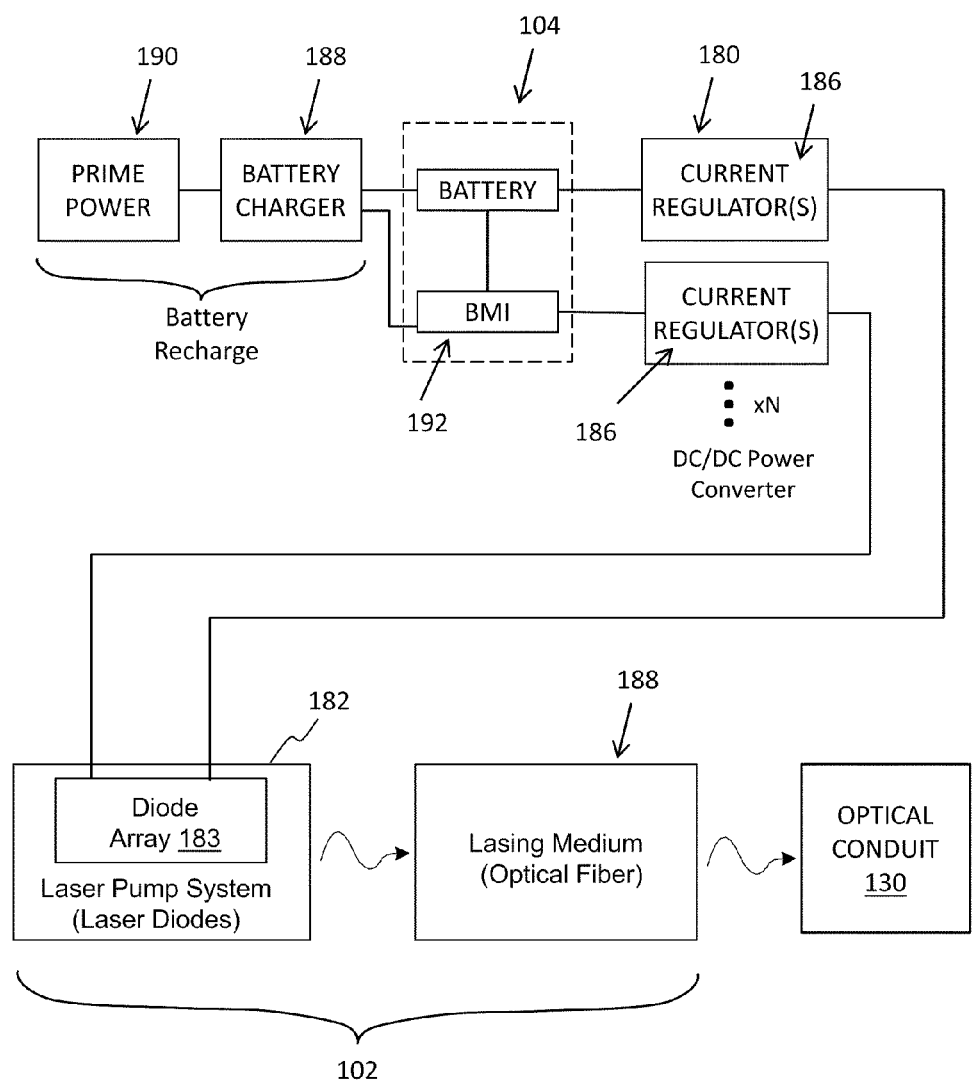
FIG. 10 illustrates a second arrangement of components of the portable cutting device.

Referring to either FIG. 9 or FIG. 10, laser source 102 is represented. Laser source 102 includes a laser pump system 182 which includes a plurality of laser diodes 183. Laser diodes 183 provide the pump energy for the lasing medium 184 of laser source 102. The laser diodes 183 are divided into a plurality of modules. In one embodiment, 42 diodes are provided in a single module and seven modules are provided. The lasing medium 184 is provided as part of a fiber optical cable. The output of the lasing medium 184 is provided to optical conduit 130.

In FIG. 9, power supply 104 is coupled to laser diodes 183 through DC driving circuit 180 which includes a single voltage regulator 181 that powers laser diodes 183. In FIG. 10, power supply 104 is coupled to laser diodes 183 through DC driving circuit 180 which includes a plurality of current regulators 186. Each current regulator 186 provides the power to one of the modules to provide power to the diodes of that module.

Referring to either FIG. 9 or FIG. 10, power supply 104 may be charged with a battery charger 188 coupled to prime power source 190. Exemplary prime power sources include a standard AC wall outlet or an alternator of a vehicle. Power supply 104 includes a battery management interface 192 which controls the recharging of the batteries with battery charger 188.

Figure 5:
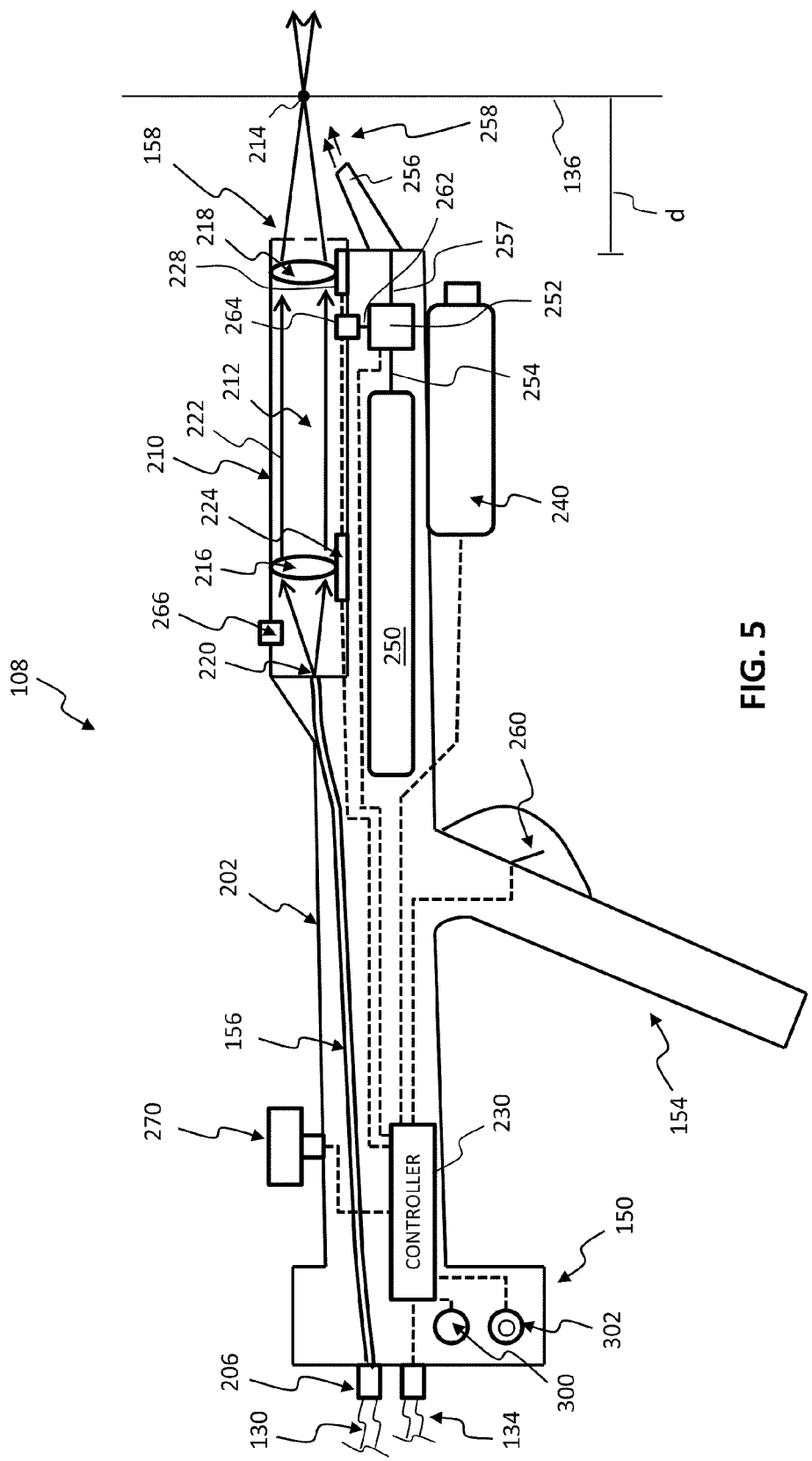
FIG. 5 is a representative view of a laser directing device of the portable cutting device of FIG. 2.

Referring to FIG. 5, an exemplary embodiment of laser directing device 108 is shown. Laser directing device 108 has a body 202 with a downwardly extending handle 204. Optical conduit 130 is coupled to an optical connector 206 which couples optical conduit 130 to optical conduit 208. Optical conduit 208 is coupled to a collimating chamber 210.

Collimating chamber 210 includes an optical system 212 which focuses light carried by optical conduit 208 at a focus 214 generally corresponding to the location of barrier 136. In one embodiment, the focal range of laser directing device 108 is from about six inches from end 158 to about sixty feet from end 158. In one embodiment, the focal range of laser directing device 108 is from about six inches from end 158 to about three kilometers from end 158.

In the illustrated embodiment, optical system 212 includes a first lens 216 and a second lens 218. First lens 216 receives the light from optical conduit 208 which acts like a point source. In the illustrated embodiment, first lens 216 is positioned such that an end 220 of optical conduit 208 is located at a focus of first lens 216 which results in a generally collimated beam 222 being produced inside of collimating chamber 210. Second lens 218 focuses collimated beam 222 at barrier 136. Although a two lens system is shown, other lens systems may be used to focus the light at focus 214.

The position of one or both of first lens 216 and second lens 218 may be altered relative to the position of end 220 of optical conduit 208 or the other of first lens 216 and second lens 218 to change the location of focus 214. In one embodiment, a portion of collimating chamber 210 is moveable relative to the remainder of collimating chamber 210 to allow an operator to manually adjust the relative spacing of first lens 216 and second lens 218 similar to a scope on a rifle. In one embodiment, first lens 216 is positioned on a moveable stand 224 and second lens 218 is positioned on a moveable stand 226. Both of moveable stand 224 and moveable stand 226 are controlled through respective motors to adjust the position of the respective first lens 216 and second lens 218.

The motors are controlled by a controller 230 of laser directing device 108. In one embodiment, controller 230 receives an input from an operator control (not shown) through which the operator specifies the desired position of focus 214. In one embodiment, controller 230 receives an input from a laser rangefinder 240 which determines the distance d from laser directing device 108 to barrier 136. Based on the determined distance d, controller 230 moves one or both of first lens 216 and second lens 218 to place focus 214 at distance d. In one embodiment, other locating devices may be used, such as GPS systems.

In one embodiment, instead of or in addition to a laser range finder device 240 includes a visible guide laser which provides a visible marker for the operator of where laser directing device 108 is going to cut. The visible guide laser should be collinear with an axis of collimating chamber 210. In one example, the visible guide laser is a HeNe laser. In one embodiment, laser source 102 acts as a guide laser. The operator wears goggles which can detect and provide a visible image of the barrier and the laser source at the barrier. In this embodiment, the laser source can be set to a low power setting to align with barrier and then set to a high power setting to cut barrier.

Laser directing device 108 also includes a compressed gas container 250 which provides air to a regulator valve 252 through a conduit 254. Regulator valve 252 provides gas to a nozzle 256 through a conduit 257. Nozzle 256 directs gas 258 at focus 214. In one embodiment, the position of nozzle 256 is adjustable. The gas blows molten material produced during cutting away from laser directing device 108, the operator, and away from barrier 136. Controller 230 controls regulator valve 252 to place conduit 257 in fluid communication with conduit 254 when a trigger 260 of laser directing device 108 is pulled by the operator. In one embodiment, the gas stored in compressed gas container 250 is a non-flammable gas. Exemplary gases include freon, nitrogen, argon, and other non-flammable gases.

Controller 230 also controls regulator valve 252 to place conduit 254 in fluid communication with a fluid conduit 262. Fluid conduit 262 terminates at a fluid inlet 264 to collimating chamber 210. The gas presented to collimating chamber 210 cools first lens 216 and second lens 218 from the heat generated by the light from optical conduit 208. Warmer gas in collimating chamber 210 is exhausted through a fluid outlet 266 of collimating chamber 210. In one embodiment, controller 230 controls regulator valve 252 to provide gas to fluid conduit 262 whenever trigger 260 is pulled. In one embodiment, controller 230 controls regulator valve 252 to provide gas to fluid conduit 262 when a temperature sensor monitoring collimating chamber 210 detects an elevated temperature.

Laser directing device 108 further includes a sensor 270 which monitors for light having generally the same wavelength provided by laser directing device 108 at focus 214. Sensor 270 monitors the intensity of the light reflected from barrier 136. Referring to FIG. 6A, when laser directing device 108 is generally normal to barrier 136, the light (represented by arrow 272) focused by laser directing device 108 strikes barrier 136 generally normal to barrier 136. A portion of the light (represented by arrow 274) is reflected by barrier 136. Often the reflected portion is small compared to the portion which interacts with barrier 136 to cut barrier 136 and as such does not pose a threat to the operator. However, when barrier 136 is more reflective the strength of the reflected portion increases. When a 1.07 micrometer wavelength beam is used, irradiance levels of about 5 milli-watts per square centimeter (mW/cm$^2$) pose a threat to the operator at any range less than 77 km, such as damage to the retina of the eye. At wavelengths less than 1.55 micrometer, light is transmitted into the eye which can damage the retina. In one embodiment, a laser source 102 having a wavelength of at least 1.55 micrometer is used. In one embodiment, a laser source 102 having a wavelength of about 2.0 micrometer is used. At wavelengths of 1.55 micrometer and greater, damage to the cornea of the eye is the concern. Since the cornea heals quite easily and the retina I generally permanently damaged, wavelengths which are absorbed by the cornea and not transmitted are considered to be "eye safe".

By monitoring the irradiance levels of the reflected portion with sensor 270, controller 230 may make a determination of actions to take. In one embodiment, if the irradiance levels of the reflected portion are above a first threshold, controller 230 sends an instruction to controller 105 to shut down laser source 102. In one embodiment, the first threshold is about 2.5 mW/cm$^2$.

In one embodiment, if the irradiance levels of the reflected portion are above a first threshold, controller 230 sounds an alarm which provides an indication to the operator that the irradiance levels of the reflected portion are elevated, but not at a threatening level. The operator may then move to the arrangement shown in FIG. 6B, wherein the light represented by arrow 272 is not normal to barrier 136; thereby causing the reflected light represented by arrow 274 to not be returned to sensor 270. However, if the irradiance levels are above a second threshold, controller 230 sends an instruction to controller 105 to shut laser source 102 down. In one embodiment, the first threshold is about 2.0 mW/cm$^2$ and second threshold is about 2.5 mW/cm$^2$.

This control sequence is represented in FIG. 7. The irradiance level of the reflected portion is monitored with sensor 270, as represented by block 280. The irradiance level is compared to a first threshold, as represented by block 282. If the irradiance level is below the first threshold, no action is taken and the irradiance level of the reflected portion is continued to be monitored with sensor 270. If the irradiance level is at or above the first threshold, then the irradiance level is compared to a second threshold, as represented by block 284. If the irradiance level is not at or above the second threshold, then an alarm is sounded, as represented by block 286. This informs the operator that irradiance levels are elevated and that action should be taken, such as changing the angle of incidence relative to barrier 136. Exemplary alarms include audio alarms (such as speakers), visual alarms (such as lights), tactile alarms (such as vibrating members), or combinations thereof. If the irradiance level is at or above the second threshold, then laser source 102 is deactivated, as represented by block 288.

Returning to FIG. 5, laser directing device 108 further includes a safety switch 300 and a laser power setting switch 302. Safety switch 300 provides a safety in case the operator inadvertently pulls trigger 260. Safety switch 300 may be a toggle switch, a dial, or any other suitable input device. Laser power setting switch 302 provides an indication of the desired power level of laser source 102. By running laser source 102 at lower power levels for applications not requiring high power settings, the charge life of power supply 104 may be extended. Laser power setting switch 302 may be any type of input devices which provides multiple settings, each corresponding to a particular power level. An exemplary input device is a dial. In one embodiment, the power level of laser source 102 may be adjusted from 0% to 100%.

Figure 8:
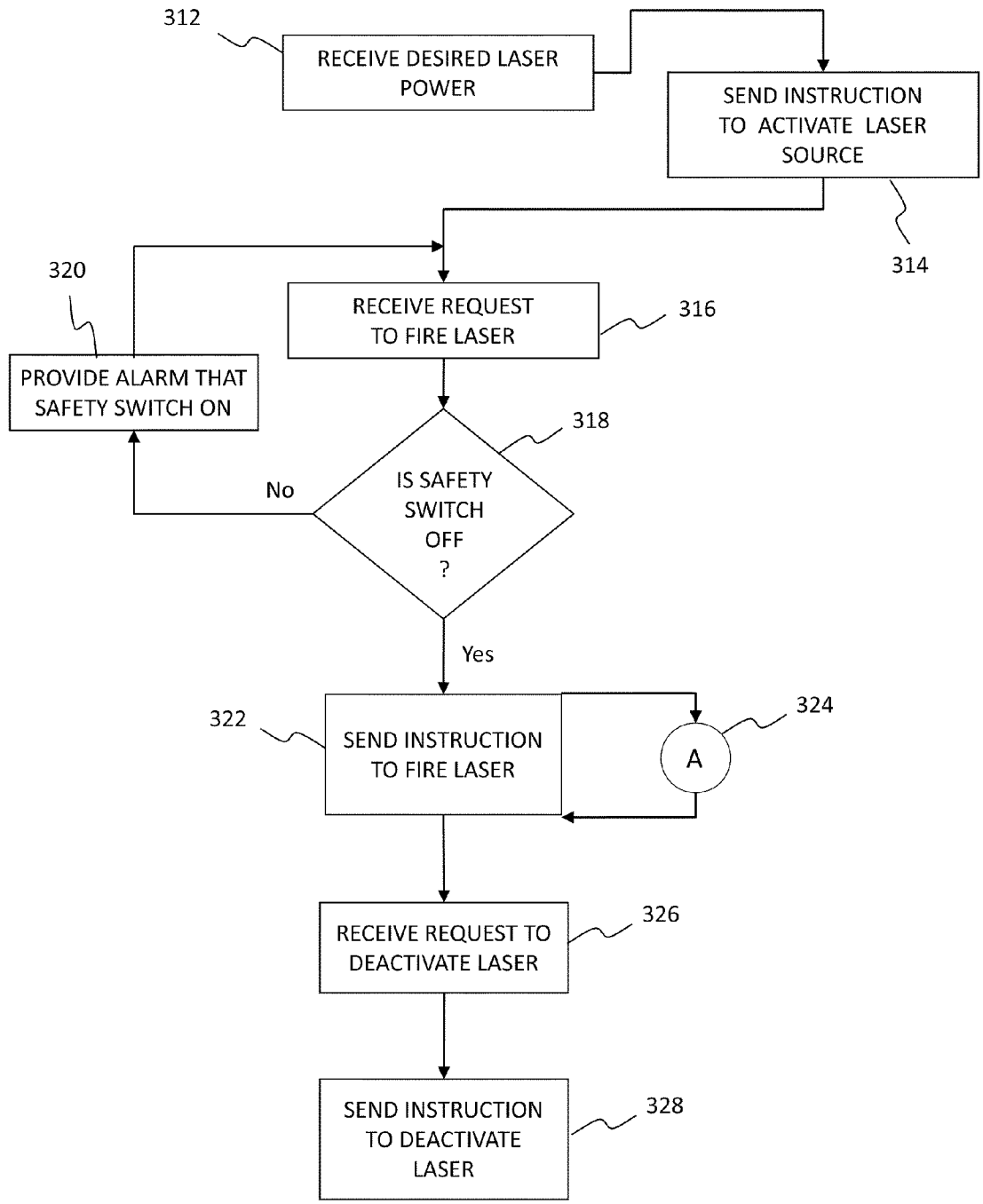
FIG. 8 illustrates another processing sequence of the controller of the portable cutting device.

Referring to FIG. 8, an exemplary operation sequence for laser directing device 108 is provided. A request is received by controller 230 to set the desired power level of laser source 102, as represented by block 312. For laser directing device 108, the request to set the desired power level of laser source 102 is the setting of laser power setting switch 302. Controller 230 sends an instruction to controller 105 to activate laser source 102 at the desired power level, as represented by block 314.

Controller 230 receives a request to fire laser source 102, as represented by block 316. For laser directing device 108, the request to fire laser source 102 is the pulling of trigger 260 which is monitored by controller 230. Controller 230 checks to see if the safety switch 302 is off, as represented by block 318. For laser directing device 108, the state of safety switch 300 is checked. If the safety switch is on, an alarm is provided to alert the operator that the safety is on, as represented by block 320. Exemplary alarms include audio alarms (such as speakers), visual alarms (such as lights), tactile alarms (such as vibrating members), or combinations thereof. If the safety switch is off, then controller 230 sends an instruction to controller 105 to fire laser source 102, as represented by block 322.

While laser source 102 is being fired, the monitoring sequence of FIG. 7 is carried out, as represented by block 324. Controller 230 receives a request to deactivate laser source 102, as represented by block 326. For laser directing device 108, the request to deactivate laser source 102 is the release of trigger 260 which is monitored by controller 230. Controller 230 sends an instruction to controller 105 to deactivate laser source 102, as represented by block 328.

With trigger 260 pulled, operator 120 moves laser directing device 108 with his/her arms to define the cutting path of laser directing device 108. As such, laser directing device 108 may be moved by human operator 120 without the need to also move laser source 102. This flexibility is provided in part by the flexibility of optical conduit 130. As represented in FIG. 2, a planned cutting path 162 is shown including a first portion 164 which has already been cut. Once cutting is complete, portable cutting device 100 may be powered off, by letting trigger 260 released. In between cutting operations, power supply 104 may be recharged or replaced.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

The invention claimed is:

1. A method of cutting a barrier, the method comprising the steps of:
    providing a laser source and a battery power supply;
    housing the laser source and the battery power supply in at least one storage container which is supported by a human operator;
    providing a handheld laser directing device which directs optical energy produced by the laser source at the barrier;
    coupling the laser source with the handheld laser directing device with an optical conduit; and
    cutting the barrier with optical energy produced by the laser source and delivered by the handheld laser directing device.

2. The method of claim 1, wherein the battery power supply includes a plurality of rechargeable batteries and the method further comprises the steps of
    charging the rechargeable batteries to a level to provide at least 10 kilowatts of power for at least six minutes.

3. The method of claim 1, wherein the at least one storage container is a backpack and the step of housing the laser source and the battery power supply in the at least one storage container includes the steps of:
    opening a cargo carrying portion of the backpack;
    placing the laser source in the cargo carrying portion of the backpack;
    placing the battery power supply in the cargo carrying portion of the backpack; and
    closing the cargo carrying portion of the backpack.

4. The method of claim 3, wherein the step of coupling the laser source with the handheld laser directing device includes the steps of:
    coupling a first end of the optical conduit to the laser source, the first end being in the cargo carrying portion of the backpack; and
    coupling a second end of the optical conduit to the handheld laser directing device, the second end being outside of the backpack, the optical conduit passing through an opening in the backpack.

5. The method of claim 4, wherein the second end of the optical conduit is coupled to a stock portion of the handheld laser directing device.

6. The method of claim 4, wherein the second end of the optical conduit is coupled to a grip portion of the handheld laser directing device.

7. A method of cutting a barrier, the method comprising the steps of:
    providing a portable cutting device for transport by a human operator on foot, the portable cutting device includes a laser source, a power supply, and a handheld laser directing device, the laser source and the power supply being positioned in at least one storage container;
    positioning a head end of the handheld laser directing device proximate to the barrier;
    sending optical energy generated by the laser source to the head end of the handheld laser directing device through an optical conduit; and
    focusing the optical energy at the barrier to cut through the barrier.

8. The method of claim 7, wherein the optical energy has a power level of at least 3 kilowatts.

9. The method of claim 7, wherein the laser source is a continuous wave single mode fiber laser.

10. The method of claim 7, wherein the portable cutting device provides sufficient power to cut through half inch steel at a rate of at least 50 inches per minute.

11. The method of claim 7, wherein the handheld laser directing device is moveable relative to the laser source such that the handheld laser directing device may be moved during the step of directing the optical energy at the barrier to cut through the barrier while the laser source remains stationary.

12. The method of claim 7, further comprising the steps of:
    monitoring an amount of optical energy reflected from the barrier; and
    disabling the laser source when the amount of optical energy reflected from the barrier exceeds a first threshold.

13. The method of claim 12, further comprising the step of providing an alarm when the amount of optical energy reflected from the barrier exceeds a second threshold, the second threshold being less than the first threshold.

14. The method of claim 7, further comprising the steps of:
    supporting a compressed air container on handheld laser directing device; and
    directing an air stream with air from the compressed air container towards the optical energy focused at the barrier.

15. The method of claim 14, further comprising the steps of:
    monitoring when a trigger of the handheld laser directing device is pulled; and
    in response to the trigger being pulled activating the laser source, and opening a valve in fluid communication with the compressed air container to produce the air stream.

16. The method of claim 15, wherein the laser source is activated if a safety switch on the handheld laser directing device is off.

17. The method of claim 14, wherein the compressed air container provides air to cool an optical system which focuses the optical energy at the barrier.

18. The method of claim 7, further comprising the steps of:
    determining a range to the barrier with a rangefinder device supported the handheld laser directing device; and
    adjusting a focal length of an optical system which focuses the optical energy at the barrier.

19. The method of claim 18, wherein the optical system includes a first lens being mounted on a moveable stand, and wherein the step of adjusting a focal length of the optical system includes the step of moving the first lens to result in the optical system having a first focal length.

20. The method of claim 7, wherein the laser source is coupled to the handheld laser directing device through an optical conduit which is positioned within a protective sheath.

* * * * *